(No Model.)

J. C. LYON.
PROPAGATING BOX.

No. 495,049. Patented Apr. 11, 1893.

WITNESSES
H. A. Lamb
Pearl Reynolds

INVENTOR
Jay C. Lyon
By A. M. Wooster atty.

UNITED STATES PATENT OFFICE.

JAY C. LYON, OF JUDD'S BRIDGE, CONNECTICUT.

PROPAGATING-BOX.

SPECIFICATION forming part of Letters Patent No. 495,049, dated April 11, 1893.

Application filed September 15, 1892. Serial No. 445,973. (No model.)

*To all whom it may concern:*

Be it known that I, JAY C. LYON, a citizen of the United States, residing at Judd's Bridge, in the county of Litchfield and State of Connecticut, have invented certain new and useful Improvements in Propagating-Boxes; and I do hereby declare the following to be a full, clear, and exact description of the invention, such as will enable others skilled in the art to which it appertains to make and use the same.

My invention has for its object to provide a box or case for germinating seeds, forcing plants, &c., as for instance in the propagation of roses and the raising of tobacco, cabbage and tomato plants, the special object being to produce inexpensive and small sized boxes each of which shall be an independent green house on a small scale, so that persons may sprout their own plants without being dependent on green house supplies.

Figure 1:
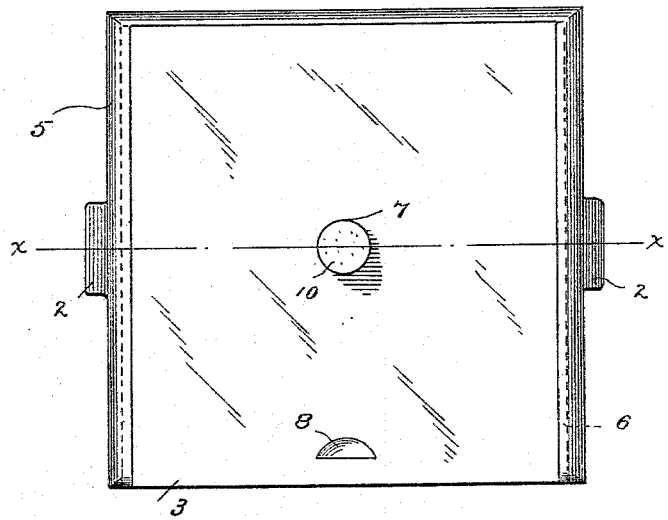
Figure 2:
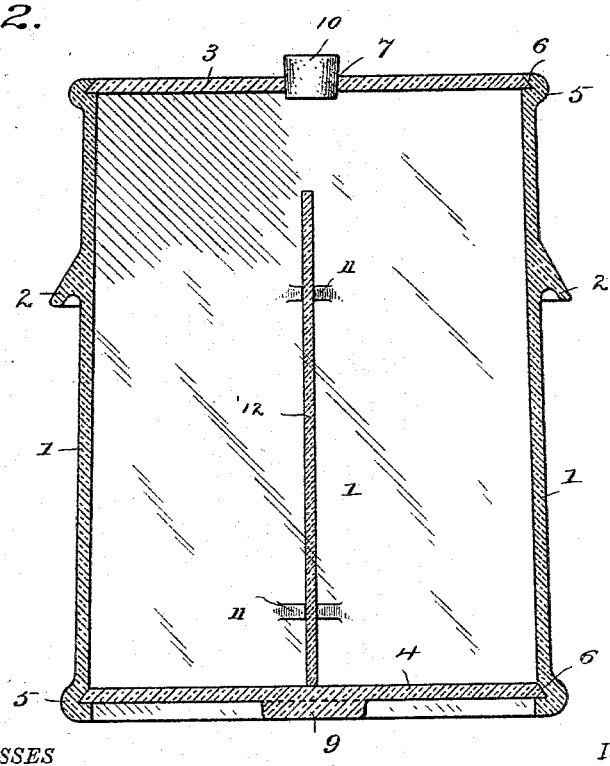

With these ends in view I have devised the novel propagating box which I will now describe referring by numbers to the accompanying drawings forming part of this specification in which Figure 1 is a plan view, and Fig. 2 a section on the line *x x* in Fig. 1.

1 denotes the body of the box which is made entirely of glass and may be of any suitable size or shape. The sides of the box may be straight although in practice I preferably make them incline downward and outward slightly for a purpose presently to be explained. The sides are preferably provided with handles 2 for convenience in lifting.

3 denotes a removable top and 4 a removable bottom. The top as well as the body is made of glass and the bottom may or may not be made of glass as preferred. In practice I ordinarily make the three parts entirely of glass. The removable top and bottom may be secured to the body in any preferred manner as for instance if the box is made round by threading the parts and securing them together in that manner. In practice however I preferably make the box square or rectangular in form and provide heavy beads 5 at the top and bottom which are provided with under cut grooves 6 to receive the sliding top and bottom, the beads being provided for the purpose of strengthening the box where the top and bottom slide in. The top is provided with a central opening 7 which may or may not be plugged, and with a depression 8 straight on one side for the purpose of removing it conveniently. The bottom is provided with a boss 9 upon which the weight of the bottom rests so as to avoid any danger of breaking the bottom.

In order that two kinds of plants may be sprouted in the box at the same time and their roots be kept entirely separated I provide on opposite inner sides of the body pairs of lugs 11 which are adapted to support a partition 12, which may extend from the bottom nearly up to the top. This partition may be made of any suitable material but is preferably made of glass, and being readily removable may or may not be used as found most convenient in view of the special uses to which the box may be placed.

In use the bottom is inserted, the partition being first inserted if required, and the box or case filled with rich earth. The seeds or cuttings to be sprouted are then placed therein and the top inserted or attached as may be desired. If it is desired to have the moisture remain in the box a suitable stopper 10 is placed in opening 7. By making the sides incline downward and outward slightly it is made very easy to remove the plants and all the earth in the box with them, which is of course desirable in transplanting. To remove the plants it is simply necessary to remove the bottom and jar the box or case slightly until the contents will drop out.

Having thus described my invention, I claim—

1. A propagating box consisting of a body made entirely of glass and having handles 2, a removable glass top having a central opening, and a removable bottom.

2. A propagating box consisting of a body made entirely of glass and having inclined sides, a sliding top also made of glass, and a sliding bottom provided with a boss by which the weight of the bottom and contents are supported.

3. A propagating box consisting of a body made entirely of glass and provided on opposite inner sides with pairs of lugs, a removable glass top, a removable bottom, and a removable partition adapted to engage the lugs and rest upon the bottom.

In testimony whereof I affix my signature in presence of two witnesses.

JAY C. LYON.

Witnesses:
H. LeRoy Randall,
E. J. Emmons.